United States Patent [19]

Gutman

[11] Patent Number: 4,760,218

[45] Date of Patent: Jul. 26, 1988

[54] INTER-LOCKED BUTTON ACTUATED MATRIX SWITCH SYSTEM, PARTICULARLY FOR AUTOMOTIVE INSTRUMENTATION WITH BUTTON CLUSTER SWITCHING

[75] Inventor: Robert F. Gutman, St. Clair Shores, Mich.

[73] Assignee: United Technologies Automotive, Inc., Dearborn, Mich.

[21] Appl. No.: 112,988

[22] Filed: Oct. 27, 1987

[51] Int. Cl.$^4$ .................. H01H 3/00; H01H 13/00
[52] U.S. Cl. ................... 200/5 R; 200/5 E; 200/17 R; 200/339; 200/61.54
[58] Field of Search ............ 200/5 R, 1 R, 6 R, 6 B, 200/6 BB, 17 R, 18, 153 K, 315, 339, 329, 330, 61.54–61.57

[56] References Cited

U.S. PATENT DOCUMENTS

| | | | |
|---|---|---|---|
| 3,399,287 | 8/1968 | Euler | 200/330 |
| 3,482,542 | 12/1969 | Mace | 200/315 X |
| 3,691,324 | 9/1972 | Brantingson | 200/5 E |
| 4,401,864 | 8/1983 | Ichikawa | 200/6 B X |
| 4,520,240 | 5/1985 | Swindler | 200/5 R |
| 4,654,488 | 3/1987 | Westfall | 200/17 R X |
| 4,710,602 | 12/1987 | Baity et al. | 200/339 X |

Primary Examiner—J. R. Scott

[57] ABSTRACT

An inter-locked button actuated matrix switch system for automotive instrumentation with button cluster switching, in which the switches form a 2×2 matrix switch circuit free of diode feedback protection in its input lines, the button structures being rocker mounted preventing the concurrent actuation of their associated switches. One button structure integrally includes two, closely spaced button elements having the look and feel of two independent buttons, with the other button structure having a relatively wide, single, continuous button actuation surface, the three "buttons" being located in line forming a button cluster for the automobile's information center. The first two, integrally formed button elements are used to set the basic parameters of the information system (English or metric, and zeroing of odometer), while the third, wider button is used in a rocking motion to sequence back and forth to present various information and displays (time of day, odometer reading, fuel consumption rates, trip miles to go, etc.). The button cluster can be located on the instrument panel, the console, the steering wheel or the driver's interior door panel, and the display can be visual and/or audio.

22 Claims, 2 Drawing Sheets

INTER-LOCKED BUTTON ACTUATED MATRIX SWITCH SYSTEM, PARTICULARLY FOR AUTOMOTIVE INSTRUMENTATION WITH BUTTON CLUSTER SWITCHING

DESCRIPTION

TECHNICAL FIELD

The present invention relates to electrical switching systems, particularly of the switch matrix type, and to the design of the button actuators for such switch systems, particularly those designed for the automotive instrument panel art having button cluster switching.

BACKGROUND OF THE INVENTION

It is known in the automotive instrument panel art to use matrix switching for various ones of the information functions controlled by the driver or a passenger in the vehicle by depressing one or more buttons in a cluster. An exemplary matrix switch in such an application would include, for example, at least four switches, the four switches having two voltage input lines and two strobe lines, with each of the voltage input lines going to two of the switches and each of the strobe lines going to two switches differing in combination than the common input line switches. Thus, for example, the common input lines would go to switches 1 & 3, and switches 2 & 4, respectively, of the four switch matrix, while the common strobe lines would go to switches 1 & 2, and 3 & 4, respectively.

Such strobing determines which one(s) of the exemplary four switches may be closed at any particular point in time. The advantage of such a matrix array is that, rather than requiring, for example, eight independent wires going to the four switches, a total of four is sufficient, two for the input lines and two for the strobe lines.

However, a drawback to such a system is that, should three of the four switches be concurrently closed at any particular point in time, the strobe system would read that all four switches are closed, because of the presence of a feedback loop. In order to avoid this problem, prior circuit design has required that diodes or other unidirectional current flow limiting devices be put in line with the input lines to each of the switches, thus requiring the addition of four diodes to prevent in a 2×2 matrix the possibility of such a false signal reading. This obviously causes additional expense in the circuitry and the assembly thereof and adds to the number of electronic components that can malfunction.

Additionally, with respect to the specific application of a button cluster for automotive instrument panel displays, the switching design typically has required independent buttons for the switches, further adding to the cost of the system. An exemplary application is for the automotive or trip information center for an automobile which, upon the actuation of the appropriate button(s), displays such information as the time of day, the odometer reading, fuel consumption rates (instant or average), trip miles to go, average trip speed, estimated time of arrival for the trip in process, etc., with the displays to be either in English or metric units depending upon the user's selection, and with a trip odometer reset button for zeroing the reading. Such an exemplary application in, for example, the "Lincoln Continental Mark VII" has included a cluster array of twelve separate buttons arranged in a single line.

In an exemplary, preferred aspect of the invention, a two "button" rocker switch button structure is used to prevent the concurrent actuation of its two associated switches in order to prevent the possibility of the concurrent actuation of three of the four switches in a 2×2 matrix and to achieve economies in the number of button members to be molded, but still maintain the appearance and feel of independent buttons.

As a general proposition, rocker switch actuating mechanisms for controlling a plurality of switches, allowing only one or a preselected number of particular ones, to be actuated is known, noting, for example, the U.S. Pat. Nos. (3,691,324 to Brantingson issued Sept. 12, 1972) and (3,399,287 to Euler issued Aug. 27, 1968).

The Brantingson switch uses a single floating button structure with the external general appearance of two substantially spaced buttons. However, in Brantingson, because of the relatively large spacing between its two external button surfaces on a common button structure, and the fact that it "floats", it is clear to the user that the movement of one obviously and clearly moves the other and that they are, in fact, part of the same integral structure.

In Euler, the whole rocking panel carrying six button surfaces is externally displayed, and the common movement is likewise clearly visible.

Additionally, neither the Brantingson patent nor the Euler patent suggest the use of their rocking switch actuators with a matrix switching system.

DISCLOSURE OF INVENTION

Thus, the present invention in a first one of its aspects is directed to eliminating the need for the diodes in matrix switching systems. The present invention achieves this goal by the use of specially designed button actuators for the switches which, by their design, prevents the concurrent actuation of three or more of the switches in the exemplary 2×2 switch matrix and indeed, in the preferred embodiment, allows only the concurrent actuation of two of the four switches.

In the preferred embodiment of the buttons, two independent button structures each controls two switches with each button structure being mounted for rocking action about its support to depress one or the other of its associated switches, thereby preventing its two associated switches from being concurrently closed. Thus, the associated switches are mechanically locked-out with respect to each other.

Further, at least one of the rocking button structures is preferably configured and housed to have the outward appearance of two separate buttons, with the button structure having a relatively small downward travel to its rocker design, so that the actuation of one side of the button structure has the feel as well as the look of an independent button switch. Additionally, adding to this illusion, is the closely adjacent, one directly next to the other, positioning of the two button surfaces, with the button structure having a fixed, non-floating pivot attachment to its surrounding housing and support structure.

With this exemplary form of mechanical lock-out of concurrent switch closings, the need for the electronic diode feedback protection in the associated electronic control module is obviated. Thus, the rocker design for the buttons allows at most, only two simultaneous switch closures within the exemplary 2×2 matrix, preventing the possibility of unwanted feedback to the control module, which would otherwise possibly give a false reading of a closed switch, when, in fact, the switch was still open.

Some of the advantages of the switch design of the preferred embodiment of the present invention are:

(1) Only two button structures need to be molded instead of three, because of the use of rocker buttons, in a 2×2 switch matrix.

(2) The actuation travel is low which, with the preferred button structure design, gives the appearance of three individual, independent buttons, although in fact only two button structures are involved.

(3) Tactile feedback is provided.

(4) The switch structure can include an all-snap together design, if desired, for economy and ease of assembly.

(5) The system of the present invention provides matrix switching capability, with reduced expense to the associated electronic control module, with elimination of the four diodes in a 2×2 matrix, which otherwise would be necessary for feedback protection to prevent false readings.

The principles of the present invention are, of course, applicable to other sizes of switch arrays, the four switches of a 2×2 matrix representing only a minimum number of switches and a minimum matrix size.

The foregoing and other features and advantages of the present invention will become more apparent from the following description and drawings.

BEST MODE FOR CARRYING OUT THE INVENTION

Figure 1:
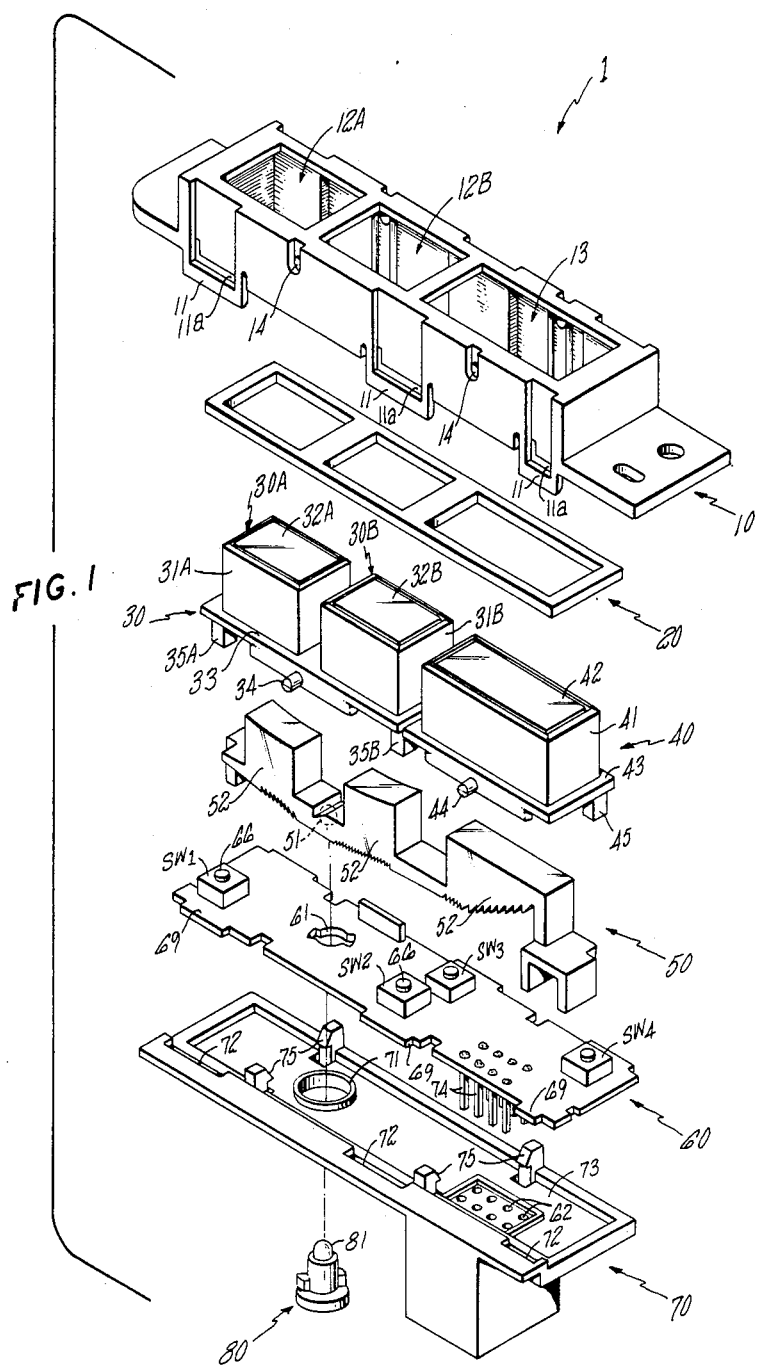
FIG. 1 is a perspective, exploded view of the preferred, exemplary embodiment of the overall button structures and associated housing and switching elements for an exemplary 2×2 cluster switch matrix system.

As can be seen in the exploded view of FIG. 1, the overall button cluster switch actuator system 1 of the preferred, exemplary embodiment includes in a sandwiched, nested package—a housing 10, a gasket 20, two adjacent, independent rocker button structures 30 & 40, a light pipe section 50, a printed circuit (PC) board assembly 60, a connector/cover assembly 70 and an electric bulb/socket 80. The button structure 30 includes two separated but closely spaced button elements 30A, 30B, associated with switches $SW_1$ & $SW_2$ located below them, while button structure 40 includes only a single, relatively wide button element associated with switches $SW_3$ & $SW_4$ located beneath it. As explained more fully below, the button structures 30, 40 are rocker mounted within the housing 10.

When the button cluster package 1 is fully assembled, the bulb/socket 80 extends up through a circular opening 71 in the connector/cover assembly 70, with the bulb 81 and part of the socket further extending up through the opening 61 in the PC board assembly 60, into which it is twisted for a twist-lock fit. The bulb 81 then further extends up into the opening 51 in the light pipe 50.

The light pipe 50 serves to somewhat evenly disperse or distribute the light from the bulb 81 into the interiors of the button structures 30, 40, illuminating them for enhanced night time visibility. The light pipe 50, which can be made of, for example, a solid acrylic, has a set of three integral towers 52, which nest into the interiors of the hollow button body areas 31A, 31B and 41. Identifying indicia (not illustrated) for the three buttons may be included on, or at least associated with, the back-lighted button surfaces 32A, 32B and 42.

The PC board 60 carries on its upper surface four switches $SW_1$–$SW_4$, the first two being associated with button structure 30 and the other two associated with button structure 40. The PC board 60 is positioned on the ledge 73 of the connector/cover assembly 70, with the male leads 74 extending through the connector openings 62, which are in turn electrically connected to the switches $SW_1$–$SW_4$ by the printed circuit (not illustrated for simplicity purposes). The board 60 is locked into position on the assembly 70 by the snap latching arms 75.

The housing 10 holds the other sandwiched elements together by having bottom tab extensions 11 snap into latching engagement with PCB tabs 69 in slots 11a through mating snap openings 72 on the connector/cover assembly 70. The gasket 20 provides a resilient, flexible interfacing between the housing 10 and the peripheral side edges 33, 43 of the button structures 30, 40, with the button elements 30A, 30B and 40 extending up from the housing 10 through the openings 12A, 12B, 13, respectively.

The button structures 30, 40 are attached to the housing 10 by means of pivot pins 34, 44, which extend into mating female openings 14 in the sides of the housing 10. Each button structure 30, 40 is thereby mounted in the housing for rocking engagement with the switches $SW_1$–$SW_4$, which engagement ultimately closes one of the two switches associated with each button structure, depending upon the direction of rock. Thus, only two of the switches $SW_1$–$SW_4$ can be concurrently closed. As should be understood from the drawings, when button structure 30 is rocked, the bottom legs 35A, 35B will close the switches $SW_1$, $SW_2$, respectively, depending on the direction of rock; while, when button structure 40 is rocked, the bottom leg 45 or the analogous leg at the other end of the structure (not viewable in FIG. 1), will close the switches $SW_4$ or $SW_3$, respectively, again depending on the direction of rock.

However, it is noted that with respect to button structure 30, it has the outward appearance and feel of two separate, independent buttons 30A & 30B, so that when one of them is depressed, causing the button structure 30 to rock or pivot about the pivot pin 34, it appears to the casual observer that the two button sections 30A and 30B are separate, independent buttons. This is particularly so because of the low or small travel or movement that occurs when either of the button sections 30A or 30B is depressed, this travel being a function of the separation distance between each of the upper button actuation surfaces 32A, 32B of each button section 30A, 30B and the pivot pin 34, and the travel distance of bottom legs 35A, 35B, as either is moved down against its respective switch $SW_1$ or $SW_2$, respectively, on the underlying PC board assembly 60. This latter travel in turn is a function of the separation distance 68 (note FIG. 2) of the resiliently biased open switch contacts 66, 67, on the upper ones 66 of which the bottoms of the legs 35A and 35B typically rest. Additionally, the housing 10 bridges over and opaquely covers the interconnecting base 33 between the button elements 30A, 30B, so that the interconnecting structure is unseen.

Exemplary dimensions for the button structure 30 are outlined below:

| | |
|---|---|
| Spacing between the adjacent walls of button sections 30A, 30B | 0.2″ |
| Lateral dimensions (width to height) of button surfaces 32A, 32B | 0.7″ × 0.5″ |
| Separation distance between the distal ends of button surfaces 32A, 32B and pivot pin 34 | 1″ |
| Travel or separation distance 68 of the resiliently biased switch contacts 66, 67 on switches SW$_1$, SW$_2$ | 0.01″ |

Thus, in order to achieve the look and feel of two independent "buttons" with a common, rocking button structure, the spacing between the button elements is preferably no more than about two-tenths of an inch, while the switch closing travel of the associated switches is no more than about ten-thousandths of an inch, with the total, combined widths and spacing of the button elements being no more than about one and six-tenths inches. With such dimensions, the outer edge of the undepressed button element travels only about ten-thousandths of an inch, when the other connector button element is depressed, closing its associated switch. Ideally, the switch closing portions (e.g., legs 35A, 35B) of the button structure are positioned as outboard as far as is feasible from the rocking pivot point, being located, for example, at the outer, lateral extents of the button structure 30, as illustrated.

Figure 2:
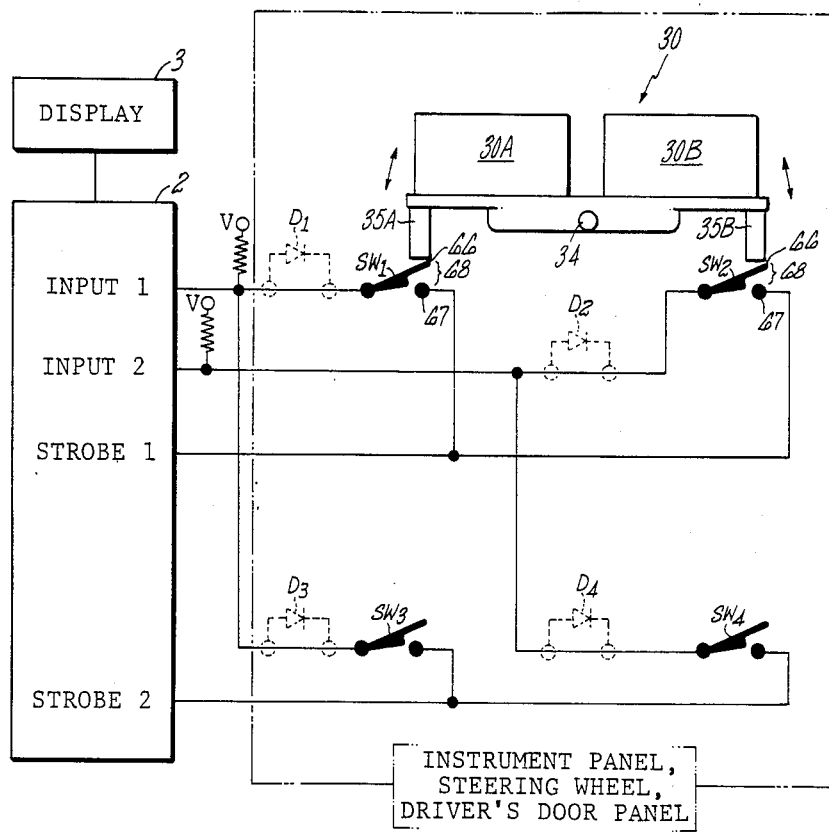
FIG. 2 is a simplified, schematic view of an exemplary 2×2 matrix switch system, illustrating the location of the diodes used in the prior art circuitry, which diodes are enclosed in phantom boxes in the drawing and which are eliminated by the rocker switch button design used in the preferred, exemplary system of the present invention.

The circuitry for the switching portion of the electronic elements on the PC board assembly 60 is illustrated in FIG. 2, except that the four diodes D$_1$–D$_4$ of the prior art (illustrated in phantom line), which were connected serially in line between the input and the switch, are preferably eliminated from the circuit in both aspects of the invention.

As can be seen in FIG. 2 and as indicated above with respect to the prior art, the common "Input 1" line goes to one side (e.g. switch leg 66) of the switches SW$_1$ & SW$_3$, and the common "Input 2" line goes to one side (e.g. switch leg 66) of the switches SW$_2$ & SW$_4$; while the common "Strobe 1" line goes to the other side (e.g. switch point 67) of the switches SW$_1$ & SW$_2$, and the common "Strobe 2" line goes to the other side of switches SW$_3$ & SW$_4$. The voltage of the input lines is typically taken from a line voltage "V", as illustrated. As is commonly known, in most vehicles a DC battery power source of twelve volts is available to power the vehicle's components. However, it should be understood that these aspects of the preferred embodiment are not ipso facto directly part of the invention, but instead follow the current prior art practice.

An exemplary automotive application for the button switch assembly 1 is as a "three" button cluster for the trip/time information center for an automobile, which center includes typically an alphanumeric digital display 3 under the control of an electronic module 2 (note FIG. 2). Alternatively or conjunctively, the "display" could be an audio presentation in the form of voice announcements. Additionally, the phrase "automotive instrumentation display" could include other system functions, including for further example, the control of the vehicle's sound system (radio, tape and/or CD player, etc), cruise control, etc.

For the trip/time information center application, the "button" 30A could, for example, actuate the switch for alternately choosing either the English or metric unit display ("E/M"), and the "button" 30B could, for example, actuate the resetting back to zero of the trip odometer reading ("RESET"), or other such basic system parameters. In turn, the button 40 could, for example, be used as a selector ("SELECT") to sequence through, back and/or forth, in sequential order the various display functions, e.g., time of day, alarm setting(s), the trip odometer reading, fuel consumption rates (instant and trip average), trip miles to go, average trip speed, and/or estimated time of arrival for the trip in process, or other travel related information, etc.

In this exemplary application, the direction of rock of the button 40, either to switch SW$_3$ or to switch SW$_4$, would determine the "back" or "forth" direction of sequencing. Directional "arrows" or arrow tips could be put on the side edges of the button surface 41 to highlight this sequential directional feature.

As illustrated, the three "buttons" could be aligned closely spaced together in a single line, or, alternatively, the larger button 40 could be positioned in juxtaposition, parallel to (either above or below) the buttons 30A, 30B, or otherwise closely spaced together forming an associated button cluster.

The preferred embodiment in this exemplary application replaces the twelve button cluster of the prior art with a "three" button system, with two of the "buttons" being part of a single, integrated button structure. Having such a small, over-all structure capable of controlling so many functions greatly expands the number of feasible locations for the invention's switching system including not only the usual location on the instrument panel but also, for example, locating it on the driver's door or on the vehicle's steering wheel or on the console. The latter locations may allow greater ease and safety of use of the system by the driver.

Although the invention has been shown and described with respect to a detailed embodiment thereof, it will be understood by those skilled in the art that various changes in application, form and detail thereof may be made without departing from the spirit and scope of the invention.

I claim:

1. A matrix switching system, having at least four switches in at least a 2×2 matrix, comprising:
    a first switch,
    a second switch,
    a third switch, and
    at least, a fourth switch, combined in a matrix switch circuit having
        a first strobe line going to said first and second switches, and
        a separate, second strobe line going to said third and fourth switches, and
        a first input line going to said first and third switches, and
        a separate second input line going to said second and fourth switches, the input lines to said four switches being free of any unidirectional current limiting devices, including diodes, in their connections to said switches;
    at least two button structures associated with said four switches for actuating them, a first button structure being associated with at least two of said switches, said first button structure having a mechanical interlock preventing it from concurrently actuating its associated two switches, making them lock-out switches with respect to one another, said first button structure and its said mechanical interlock preventing any false readings from being detected by said strobe lines, which otherwise possibly might occur should three of said four switches be concurrently actuated, avoiding the need for any unidirectional current limiting devices, including diodes, in said input lines to said switches.

2. The matrix switching system of claim 1, wherein said two button structures each have associated therewith two different switches of said four switches, and wherein both button structures include mechanical interlocks preventing the concurrent actuation of their two respective switches.

3. The matrix switching system of claim 1, wherein said first button structure includes two integral button elements, and wherein said mechanical interlock comprises:
a rocker mounting for said first button structure between said two button elements, one of the two associated switches being located beneath one of said button elements and the other being located beneath the other of said button elements to alternatively be actuated as said button structure is rocked about its rocker mounting.

4. The matrix switching system of claim 3, wherein said first button structure has two, closely spaced, button actuation surfaces fixedly interconnected together below said button actuation surfaces, and wherein there is further included a housing for said first button structure opaquely covering over the interconnecting structure between said two button elements, and wherein said lock-out switches have a relatively small gap between its electrical contacts in being switched by the depression of said button surfaces; the overall look and feel of said button surfaces in association with said housing forming the appearance to the casual observer of two, separate, independent buttons, when either is actuated by depressing a selected one of said button surfaces.

5. The matrix switching system of claim 4, wherein said two button structures each has associated therewith two different, spaced switches of said four switches, and wherein both button structures include mechanical interlocks preventing the concurrent actuation of their two respective switches.

6. The matrix switching system of claim 5, wherein said second button structure is rocker mounted and has associated with it a single, continuous button actuation surface located above its two associated, spaced switches to actuate either one of its associated switches as either selected side edge of said button surface is depressed.

7. The matrix switching system of claim 6, wherein said three button actuation surfaces are aligned in a single line, closely spaced together forming an associated button cluster.

8. The matrix switching system of claim 6, wherein said first and second button structures and said matrix switching circuit comprise part of an automobile instrumentation display having an information display system including a display and an electronic module selectively reading and presenting with respect to said display various informational aspects of the automobile, and wherein said second button structure comprises a "back" and "forth" sequential selector button sequentially accessing a multiple number of informational aspects for said display, and wherein said first button structure comprises buttons selectively setting different basic parameters of said display system.

9. The matrix switching system of claim 8, wherein said button structures and said matrix switching circuit are included within a sandwiched, snap-on package, including a connector/cover assembly, a printed circuit board assembly, said first and second button structures, and said housing.

10. The matrix switching system of claim 4, wherein said rocker mounting includes a pivot pin centrally located near the bottom of said first button structure, which pivot pin mates with a like configured female opening in said housing, providing a relatively fixed but pivotable mounting between said first button structure and said housing.

11. A button actuated switching system for an automotive instrumentation display system for presenting informational or control aspects of the vehicle selected by the user, comprising:
at least four switches each having electrical switching contacts;
at least two button structures, each associated with two different ones of said four switches for actuating them; and
a housing for said button structures;
said first button structure having two, closely spaced, button actuation surfaces interconnected together below said surfaces, said housing opaquely covering over the interconnecting structure between said two button surfaces, the switches associated with said first button structure requiring relatively small travel of said first button structure for its electrical contacts to be switched by the depression of the selected one of said button surfaces; the overall look and feel of said button surfaces in association with said housing forming the appearance to a casual observer of two, separate, independent buttons, when either button actuation surface is actuated by depressing a selected one of said button surfaces;
said second button structure having associated with it a single button actuation surface located above its two associated switches to actuate either one of its associated switches, as either selected side edge of said button surface is depressed; said three button surfaces being positioned closely spaced together forming an associated button cluster.

12. The button actuated switching system, for an automotive instrumentation display of claim 11, wherein said first and second button structures and said switches comprise part of an automobile instrumentation display having an information display system including a display and an electronic module selectively reading and presenting with respect to said display various informational aspects of the automobile, and wherein said second button structure comprises a "back" and "forth" sequential selector button sequentially accessing a multiple number of informational aspects for said display, and wherein said first button structure comprises buttons selectively setting different basic parameters of said display system.

13. The button actuated switching system, for an automotive instrumentation display, of claim 11, wherein said button structures and said switches are included within a sandwiched, snap-on package, including a connector/cover assembly, a printed circuit board assembly, said first and second button structures, and said housing.

14. The button actuated switching system, for an automotive instrumentation display, of claim 11, wherein said four switches are combined in a matrix switch circuit having
   a first strobe line going to first and second ones of said switches, and
   a separate, second strobe line going to third and fourth ones of said switches, and
   a first input line going to said first and third switches, and
   a separate second input line going to said second and fourth switches, the input lines to said four switches being free of any unidirectional current limiting devices, including diodes, in their connections to said switches.

15. The button actuated matrix switching system for an automotive instrumentation display, of claim 14, wherein said button structures and said matrix switching circuit are included within a sandwiched, snap-on package, including a connector/cover assembly, a printed circuit board assembly, said first and second button structures, and said housing.

16. The button actuated matrix switching system, for an automotive instrumentation display, of claim 14, wherein each of said two button structures includes a rocker mounting with respect to their respective two switches, which switches are positioned to either side of said rocker mounting.

17. The button actuated switching system, for an automotive instrumentation display, of claim 11, wherein the outer edge of the undepressed button actuation surface of said first button structure travels only about ten-thousandths of an inch, when the other button actuation surface is depressed switching its associated switch.

18. The button actuated switching system, for an automotive instrumentation display, of claim 17, wherein the spacing between said button actuation surfaces is no more than about two-tenths of an inch, and the switching closing travel of said associated switch of said first button structure is no more than about ten-thousandths of an inch with the total, combined widths and spacing of said button actuation surfaces being no more than about one and six-tenths inches.

19. The button actuated switching system, for an automotive instrumentation display, of claim 11, wherein said button structures are located on the driver's door.

20. The button actuated switching system, for an automotive instrumentation display, of claim 11, wherein said button structures are located on the steering wheel.

21. The button actuated switching system, for an automotive instrumentation display, of claim 11, wherein said three button surfaces are juxtaposed and aligned in a single line.

22. The button actuated switching system, for an automotive instrumentation display, of claim 11, wherein said information aspects include trip related information for the vehicle.

* * * * *